United States Patent [19]
Schmid et al.

[11] Patent Number: 5,646,387
[45] Date of Patent: Jul. 8, 1997

[54] TAXIMETER

[75] Inventors: Mechtilde Schmid, Villingen-Schwenningen; Holger Jäckle, Rottweil; Siegfried Koch, Villingen-Schwenningen, all of Germany

[73] Assignee: Mannesmann Kienzle, Villingen, Germany

[21] Appl. No.: 733,092

[22] Filed: Oct. 16, 1996

Related U.S. Application Data

[63] Continuation of Ser. No. 229,035, Apr. 18, 1994, abandoned.

[30] Foreign Application Priority Data

Apr. 21, 1993 [DE] Germany ............... 9306016 U

[51] Int. Cl.⁶ ............... G07B 13/00; G06F 17/00
[52] U.S. Cl. ............... 235/30 R; 364/464.27
[58] Field of Search ............... 235/30 R, 30 A, 235/44, 45; 364/467, 464.01

[56] References Cited

U.S. PATENT DOCUMENTS 4,740,900 4/1988 Adams ............... 235/30 R

*Primary Examiner*—Cassandra C. Spyrou
*Attorney, Agent, or Firm*—Anderson Kill & Olick PC

[57] ABSTRACT

A taximeter is disclosed which comprises a housing having a front side, an electronic computer, data memories, a buffer battery, a display arrangement, one of pushbuttons and keys for providing functional control and for calling up contents of at least one of the data memories which is assigned to the display arrangement, and a parametric and diagnostic contacting arrangement. The parametric and diagnostic contacting arrangement is accessible from the front side of the housing. The parametric and diagnostic contacting arrangement and the buffer battery are accessible through an aperture which is coverable by one of a lead-sealed lid and a cover and is provided at the front side of the housing.

3 Claims, 2 Drawing Sheets

TAXIMETER

This is a continuation of application Ser. No. 08/229,035, filed Apr. 18, 1994 abandoned.

FIELD OF THE INVENTION

The present invention is directed to a taximeter and, in particular, to a taximeter which has an electronic computer and data memories, as well as, a buffer battery with a display arrangement and pushbuttons or keys which are allocated to same for the functional control, and for the calling up of memory contents, and which further has a contacting arrangement which is accessible on the front side thereof for parametric and diagnostic purposes.

BACKGROUND OF THE INVENTION

As is well known, taximeters are utilized for fare tariff computations in rented vehicles by means of a multiplication of trip distances, which are covered, and time units, by prices, of a locally fixed tariff standard. The calculated price units are added and are indicated on a suitable display screen. The quantity of the hiring instances, trip price, distances covered with or without paying passengers, surcharge revenues, and the like, are stored for purposes of fare collection. The last-mentioned data, as well as the computation processes, have to be preserved, or the processes have to be performable also in the case of a failure of the current supply of the vehicle, contact interruptions, which are caused by shocks or corrosion, and also in cases of current supply gaps which may occur during operation of the vehicle, such as, for instance, in a cold start of diesel vehicles. In this regard, taximeters must be equipped with a buffer battery, in order to largely exclude manipulations and short-circuits, which is provided so as to allocate a buffer battery directly to the circuit board of the typically single board computer of the taximeter, and to solder it thereto.

With this concept, it is also unnecessary to provide a special battery compartment in the taximeter, which must be additionally lead-sealed and which requires more space than the direct attachment of the battery, upon the printed circuit board. The concept is thus meant to accommodate the requirement that a taximeter is to have an easy-to-read display which must be recognizable with one glance and, thus, as large a display field as possible and that the external shape of taximeters is to be constructed in such a manner that they permit an aesthetic integration into the dashboard. These contradictory requirements, which an installable taximeter has to meet, require an extensive utilization of the front wall or the front surface of the taximeter by the display and actuation means, by the model identification plate, and by means for parametric and diagnostic purposes which should be accessible from the front without having to remove the taximeter.

With the arrangement of the buffer battery upon the circuit board, if one has to put up with the circumstance that the charging capacity, and the space requirement, for the printed circuit board, must be selected to be so large, the amount of current consumption existing with the taximeter not being installed must be supplied by the buffer battery over a period of several years. Further, in this concept, a replacement of the battery by unsoldering and by resoldering is cumbersome and expensive and, in the case of insufficient care, it is not devoid of danger for the construction elements in its vicinity.

SUMMARY OF THE INVENTION

It is an objective of the present invention to reduce the expense or the voltage buffering in taximeters and to simplify the replacement of the buffer battery without endangering the access safety.

The solution of the above objective provides that the parametric and diagnostic contacting arrangement, and the buffer battery, are allocated in such a manner to one another that both are accessible through an aperture which is closable by a lead-sealed cover and which is disposed at the front wall of the taximeter housing.

A preferred embodiment of the present invention is characterized by utilizing at least one button cell as a buffer battery and that the button cell be retained in such a manner, in the housing of the taximeter, so that its axis is essentially parallel to the display face.

Further, it is preferable that identical contact springs be provided for establishing contact between the button cell and the circuit board which carries the electronic components of the taximeter, that recesses be provided in the housing of the taximeter, on both sides of the mounting, for the cells and that the contact springs, which are attached to the circuit board, pass through the recesses and contact axially the inserted button cells.

The invention provides the advantage that only one aperture or service compartment is provided at the front side of the taximeter for parametric and diagnostic purposes and for the buffer battery. The service compartment can be closed off by a lid. The lid is attached by means of a housing screw and is secured by lead sealing the screw. A battery replacement can thus be performed without having to remove the taximeter, which would be fraught with considerable installation effort. The provision of having only one service compartment which has an area requirement, at the front wall of the taximeter, requires no changes of external contour, and is particularly made possible by using one or a package of relatively small button cells by way of a buffer battery, which is disposed in an access favorable position, in the service compartment, thus considerably facilitating a replacement of the battery.

The use of button cells as buffer batteries avoids soldering work and reduces the disposal work, and must take into consideration the lower capacity of the button cells compared, for instance, to a lithium battery. In this regard, the current consumption during storage of the taximeter must be prevented. Button cells are accordingly supplied together with the taximeter as accessories and are installed only upon installation of the taximeter into a motor vehicle.

The type of arrangement of the button cells in the service compartment has, apart from easy access and replacement, the advantage that two identically shaped contact springs can be used and that the button cells which stand in the shell-shaped mounting can additionally be diametrically retained by the cover or lid. In this regard, the use of a shrinkage hose, for connecting several button cells, provides the additional advantage of insulation in case the housing of the taximeter is fabricated from an electrically conductive plastics material and is connected to the chassis. It is further important to note that the present invention makes available an installation area on the circuit board while making use of free space which is available due to the external shape of the taximeter.

Accordingly, it is an object of the present invention to provide a taximeter which serves to reduce the expense or the voltage buffering in taximeters and to simplify the replacement of the buffer battery without endangering the access safety.

It is another object of the present invention to provide a taximeter that has only one aperture or service compartment at the front side of the taximeter for parametric and diagnostic purposes and for the buffer battery.

It is yet another object of the present invention to provide a taximeter wherein a battery replacement can be performed without having to remove the taximeter.

Other objects and advantages of the present invention will be made apparent to those skilled in the art upon a review of the Description of the Preferred Embodiment taken in conjunction with the drawings which follow.

DESCRIPTION OF THE PREFERRED EMBODIMENT

Figure 1:
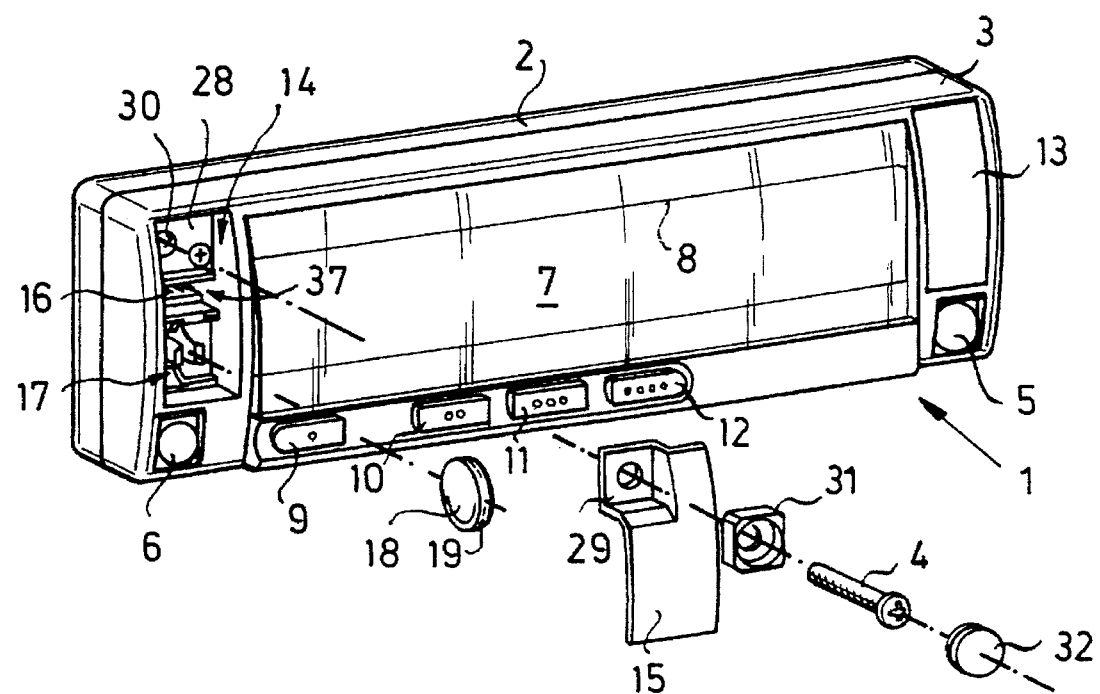
FIG. 1 illustrates a taximeter, according to the present invention, in a perspective view and with an exploded partial illustration of the detachable components which are assigned to the service compartment.

As illustrated in FIG. 1, the housing of the taximeter 1 consists of two housing components 2 and 3 which are screwed together. One of the screws is designated by the reference numeral 4 while the other screws are covered by lead-sealed caps 5 and 6. A glass plate 7 is inserted, in the usual manner, into the front housing component 3 which, at the same time, serves as a print-out page, and on which a transparent area 8, for observing the display means of the taximeter, is reserved. The control pushbuttons or keys, which are also typical in taximeters, are designated by reference numerals 9, 10, 11 and 12, while the reference numeral 13 designates a model identification plate or its attachment area, and reference numeral 14 designates an aperture in a service compartment which is provided at the front of the housing component 3.

The screw 4 which is provided for connecting the housing components 2 and 3 serves, additionally, for fastening the lid or cover 15, which is allocated to the service compartment 14.

Figure 2:
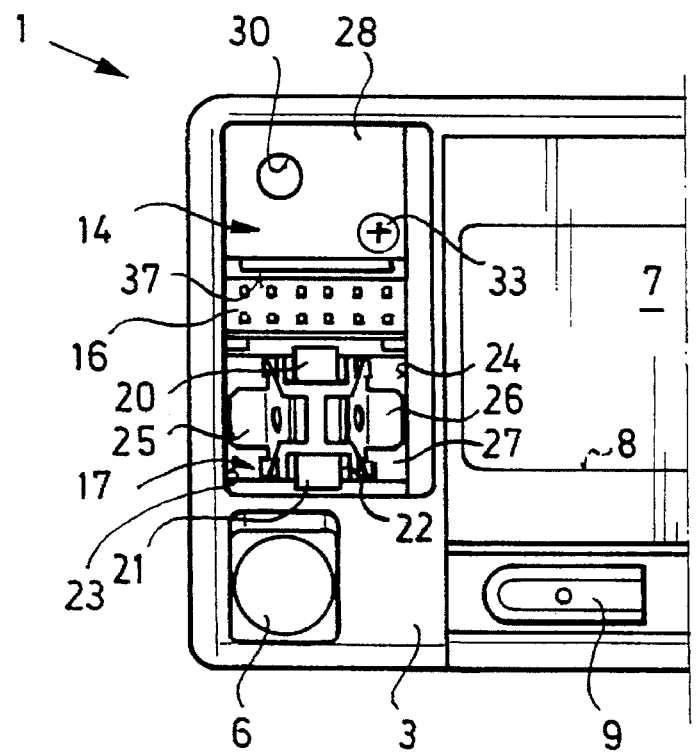
FIG. 2 illustrates a partial view of the taximeter, shown in FIG. 1, in a plan view.
Figure 3:
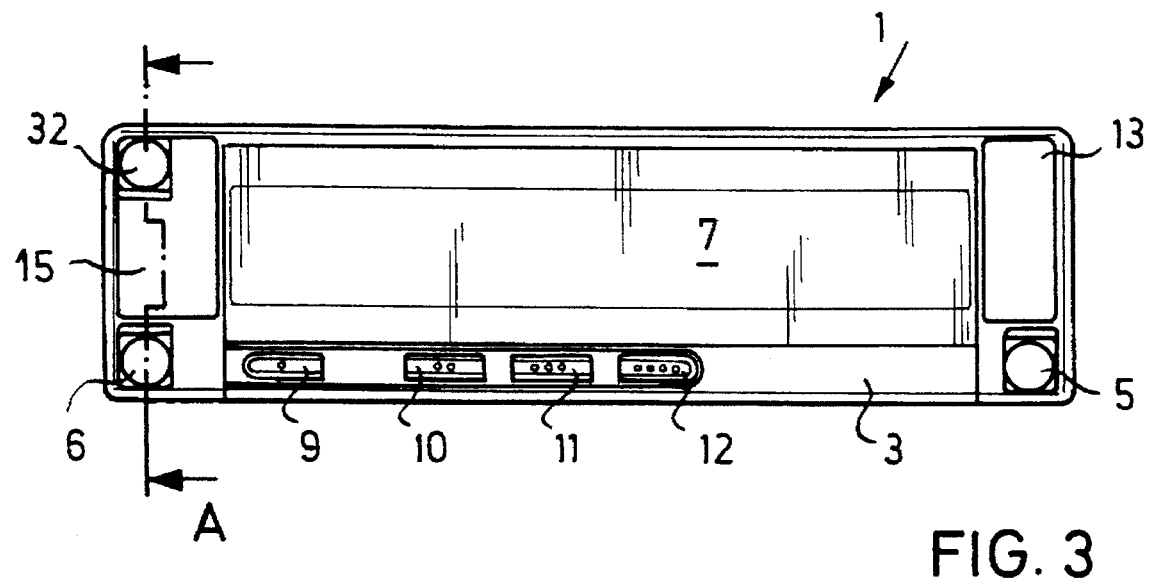
FIG. 3 illustrates a front view of the assembled taximeter of FIG. 1 which is ready for operation.

As is particularly evident from FIG. 2, a contact pin strip 16 and a mounting 17, for receiving the buffer battery, which is preferably formed by two button cells 18, are accessible from the outside, in the service compartment 14. The connection of the two button cells 18 is achieved by means of a shrinkage hose 19 which embraces the button cells in the rim area. At the same time, the shrinkage hose 19 serves as an insulator. The mounting 17 is formed by two shell-shaped bases 20 and 21 which have boundary cheeks, respectively molded at the sides, of which one is designated by the reference numeral 22.

Recesses 23 and 24 are provided on both sides of the mounting 17 which enable an engagement of identical contact springs 25 and 26, which are allocated to the buffer battery, into the service compartment 14. Contact springs 25 and 26 (not shown in detail) are fastened, in a suitable manner, onto the circuit board 27 of the taximeter 1 so that they abut, by means of molded-on lugs, against the circuit board 27 and so that they grip, by means of fingers which are staggered against one another, through the circuit board 27 and are soldered to assigned copper tracks or conductor paths.

It should also be noted, for reasons of completeness, that a platform 28 is provided inside the service compartment 14, in which the cover or lid 15 rests by means of a footing 29 which is molded to it. A lead seal cup 31, to which a lead seal cap 32 can be connected in a snap-in manner, is additionally fastened by the screw 4 to which a through bore 30 is assigned in the front of the housing component 3, as is illustrated in FIG. 1. Correspondingly, the height of the base 28 is dimensioned in such a manner that the lead seal cup 31 and the lead seal 32 form, after installation, an essentially flush connection with the front face of the taximeter. The symbol which is designated by reference numeral 33 serves, after insertion of the buffer battery, as an indication of polarity.

Figure 4:
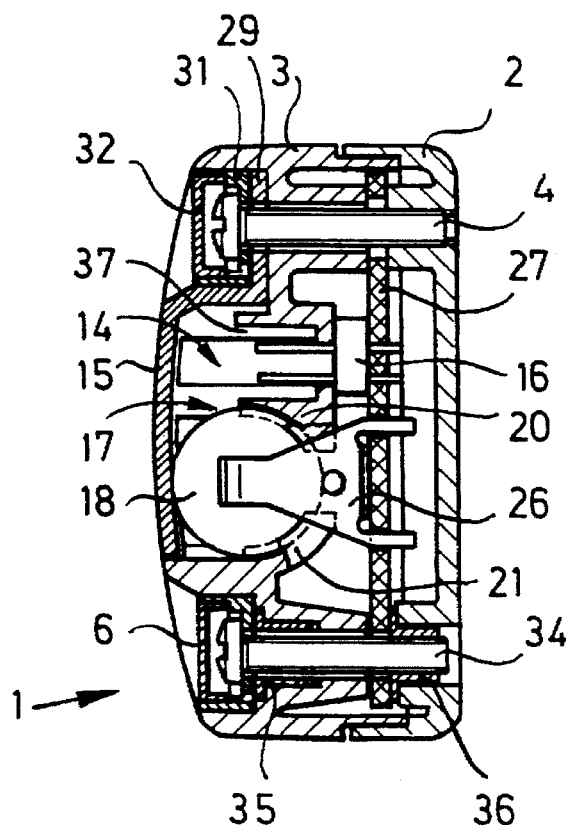
FIG. 4 illustrates a sectional view along the line A in FIG. 3.

FIG. 4 serves to illustrate that the lid or cover 15, if attached, retains the buffer battery diametrically in the mounting 18. Further, FIG. 4 shows a screw 34 to which bushings 35 and 36 are assigned for improving the chassis contact with the two housing components 2 and 3 and the circuit board 27. Another mounting is designated by the reference numeral 37, which serves for receiving a parametric and diagnostic plug. In this regard, this mounting 37 forms, together with the contact pins in the contact pin strip 16, which is fastened onto the circuit board 27, the plug-in socket for a parametric and diagnostic plug.

While the present invention has been described and illustrated in a preferred embodiment, such description is merely illustrative of the present invention and is not to be construed as a limitation thereof. Accordingly, the present invention encompasses all modifications, variations, and/or alternate embodiments, with the scope of the present invention limited only by the claims which follow.

What is claimed is:

1. An arrangement for providing an electrical buffer in a taximeter, which comprises:

a buffer battery having at least one button cell;

a taximeter housing having an opening provided in the front side of the taximeter housing for receiving the button cell, wherein the opening is accessible from outside;

a cup-shaped mounting for retaining the button cell at a substantially right angle with respect to the front surface of the taximeter; and a sealable cover arranged in the opening.

2. The arrangement of claim 1, wherein the buffer battery is formed as a packet of button cells.

3. The arrangement of claim 2, wherein contact springs are provided for contacting the button cell, and further wherein the taximeter housing has, on opposite sides of the mounting, recesses for the contact springs of the button cells.

* * * * *